US007746490B2

(12) United States Patent
Sawada

(10) Patent No.: US 7,746,490 B2
(45) Date of Patent: Jun. 29, 2010

(54) PRINTED DOCUMENT MANAGING METHOD, PRINTED DOCUMENT MANAGING PROGRAM, IMAGE FORMING APPARATUS, AND PRINTED DOCUMENT MANAGING SYSTEM

(75) Inventor: Masaichi Sawada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1549 days.

(21) Appl. No.: 11/048,070

(22) Filed: Feb. 2, 2005

(65) Prior Publication Data

US 2005/0174601 A1 Aug. 11, 2005

(30) Foreign Application Priority Data

Feb. 6, 2004 (JP) ............................. 2004-030712

(51) Int. Cl.
*G06K 15/00* (2006.01)
*G06F 3/12* (2006.01)

(52) U.S. Cl. ..................... 358/1.14; 358/1.15; 358/1.13

(58) Field of Classification Search ................ 358/1.15, 358/1.14, 1.13, 1.16, 1.17, 1.18, 1.1, 1.6, 358/1.9, 400, 401, 403, 404, 434, 435, 436, 358/437, 438, 439, 444, 468; 347/2, 3, 5, 347/14, 23; 399/1, 8; 380/51, 55; 710/15, 710/8, 62, 64, 72; 382/115; 713/182, 185
See application file for complete search history.

(56) References Cited

U.S. PATENT DOCUMENTS 6,798,996 B2 9/2004 Sawada et al.
2002/0170973 A1 11/2002 Teraura

FOREIGN PATENT DOCUMENTS

| | | |
|---|---|---|
| JP | 2001-005728 | 1/2001 |
| JP | 2001-160117 A | 6/2001 |
| JP | 2002-016788 A | 1/2002 |
| JP | 2002-120475 A | 4/2002 |
| JP | 2002-337426 | 11/2002 |
| JP | 2003-208488 | 7/2003 |

OTHER PUBLICATIONS

Japanese Office Action, dated Oct. 14, 2008, directed to counterpart Japanese Patent Application No. 2004-030712; 2 pages.

*Primary Examiner*—Dov Popovici
(74) *Attorney, Agent, or Firm*—Morrison & Foerster LLP

(57) ABSTRACT

A printed document managing method, a printed document managing program, an image forming apparatus, and a printed document managing system are provided. In the system of the present invention, a complex device reads a sheet ID recorded on a wireless IC chip attached to an original paper sheet, using a first reading unit. The complex device also reads a sheet ID recorded on a wireless IC chip attached to a paper sheet on which copying is to be performed. The complex device then records output history data having the sheet ID of the original paper sheet associated with the sheet ID of the paper sheet on which copying is to be performed, and transmits the output history data to a managing computer. The managing computer then records the output history data in an output history data storing unit.

24 Claims, 4 Drawing Sheets

PRINTED DOCUMENT MANAGING METHOD, PRINTED DOCUMENT MANAGING PROGRAM, IMAGE FORMING APPARATUS, AND PRINTED DOCUMENT MANAGING SYSTEM

BACKGROUND OF THE INVENTION

1. Field of the Invention

The present invention relates to a printed document managing method for managing printed information as to a document that is printed on a paper sheet. The present invention also relates to a printed document managing program, an image forming apparatus, and a printed document managing system.

2. Description of the Related Art

In recent years, an increasing amount of electronic data has been used and stored as original documents. In this trend, devices for guaranteeing the originality of those electronic data have been developed (originality guaranteeing electronic storage devices; see Japanese Laid-Open Patent Application No. 2001-5728, pp. 10-23, for example). When electronic data with its originality guaranteed is retrieved from an originality guaranteeing electronic storage device, the information as to the operations history such as "who did when and what . . . " is recorded.

As for the information printed on a paper sheet, a technique of using information recorded on an IC chip attached to the paper sheet and associating the paper sheet with the data of the original has been disclosed (see Japanese Laid-Open Patent Application No. 2003-208488, pp. 3-7, for example).

However, it is difficult to manage information once printed on a paper sheet, no matter how strictly the originality of electronic data is managed. More specifically, where a paper sheet having information printed thereon is copied with a copying machine, there is no way to manage the paper sheet on which the copying is performed. Therefore, tracing management cannot be performed on the information printed on the paper sheet.

SUMMARY OF THE INVENTION

A general object of the present invention is to provide a printed document managing method, a printed document managing program, an image forming apparatus, and a printed document managing system in which the above disadvantages are eliminated.

A more specific object of the present invention is to provide a printed document managing method by which tracing management can be performed on the information of a document printed on a paper sheet.

Another specific object of the present invention is to provide a printed document managing program, an image forming apparatus, and a printed document managing system with which tracing management can be performed on the information of a document printed on a paper sheet.

The above objects of the present invention are achieved by a method of managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, an output history storing unit that records an output history, and a computer. This method includes the steps of: when the computer receives a request to transfer the image of the original paper sheet onto the paper sheet on which copying is to be performed, recording output history data having a first sheet identifier associated with a second sheet identifier in the output history storing unit, the first sheet identifier being read with the first reading unit, the second sheet identifier being read with the second reading unit, the recording being performed by the computer.

By this method, the correspondence between the original paper sheet and the paper sheet on which copying is performed can be checked by referring to the output history data in a copying operation. Thus, the printed information as to a document that has been printed on a paper sheet can be traced back.

In the above method, the output history data may include data concerning the time of the transfer and be recorded together with the data concerning the time of the transfer. The computer carries out this recording process.

In this manner, the time when the transfer is carried out can be checked.

In the above method, the output history data recorded in the output history storing unit may be associated with data concerning a document identifier for identifying the document printed on the original paper sheet.

In this manner, each copied document can be identified.

The above objects of the present invention are also achieved by a method of managing a printed document, using an image forming apparatus that includes a first reading unit that reads information recorded on an information recording medium attached to an original paper sheet and a second reading unit that reads information recorded on an information recording medium attached to a paper sheet on which copying is to be performed, and an output history storing unit that records an output history. This method includes the steps of: reading a first sheet identifier recorded on the information recording medium attached to the original paper sheet, using the first reading unit; reading a second sheet identifier recorded on the information recording medium attached to the paper sheet on which copying is to be performed, using the second reading unit; forming an image on the paper sheet on which copying is being performed, based on the image of the original paper sheet; and recording output history data that has the first sheet identifier associated with the second sheet identifier in the output history storing unit, the steps being carried out by the image forming apparatus.

By this method, the correspondence between the original paper sheet and the paper sheet on which copying is performed can be checked by referring to the output history data. Thus, the printed information as to a document that has been printed on a paper sheet can be traced back.

In the above method, the output history data may be recorded together with data concerning the time when the image is formed on the paper sheet on which copying is being performed.

In this manner, the time when an image is formed on the paper sheet on which copying is being performed based on the image of the original paper sheet can be checked.

This method further includes the step of recording the first sheet identifier on the information recording medium attached to the paper sheet on which copying is being performed. The image forming apparatus carries out this recording process.

In this manner, the original paper sheet can be identified based on the first sheet identifier recorded on the information recording medium attached to the paper sheet on which copying is being performed.

The above objects of the present invention are also achieved by a method of managing a printed document, using an image forming apparatus that includes a first reading unit that reads information recorded on an information recording medium attached to an original paper sheet and a second reading unit that reads information recorded on an information recording medium attached to a paper sheet on which copying is to be performed, and a printed document managing server that includes an output history storing unit that records an output history and a copying propriety data storing unit that records data concerning the propriety of copying a printed document. This method includes the steps of: reading a first sheet identifier recorded on the information recording medium attached to the original paper sheet, using the first reading unit, and transmitting the first sheet identifier to the printed document managing server; receiving, from the printed document managing server, the data concerning the propriety of copying extracted from the copying propriety data storing unit based on the first sheet identifier; when copying is allowed in accordance with the data concerning the propriety of copying, reading a second sheet identifier recorded on the information recording medium attached to the paper sheet on which copying is to be performed, using the second reading unit; forming an image on the paper sheet on which copying is being performed, based on the image of the original paper sheet; and recording output history data that has the first sheet identifier associated with the second sheet identifier in the output history storing unit, the steps being carried out by the image forming apparatus.

By this method, copying is performed only when copying is allowed in accordance with the copying propriety data extracted from the copying propriety data storing unit. When copying is actually performed, the correspondence between the original paper sheet and the paper sheet on which the copying is performed can be checked by referring to the output history data. Thus, the printed information as to a document that has been printed on a paper sheet can be traced back.

The above objects of the present invention are also achieved by a method of managing a printed document, using an image forming apparatus that includes a first reading unit that reads information recorded on an information recording medium attached to an original paper sheet, a second reading unit that reads information recorded on an information recording medium attached to a paper sheet on which copying is to be performed, and a writing unit that writes information on the information recording medium attached to the paper sheet on which copying is to be performed, and an output history storing unit that records an output history. This method includes the steps of: reading a first sheet identifier and data concerning the propriety of copying a printed document that are recorded on the information recording medium attached to the original paper sheet, using the first reading unit; when copying is allowed in accordance with the data concerning the propriety of copying, reading a second sheet identifier recorded on the information recording medium attached to the paper sheet on which copying is to be performed, using the second reading unit, and writing the data concerning the propriety of copying on the information recording medium, using the writing unit; forming an image on the paper sheet on which copying is being performed, based on the image of the original paper sheet; and recording output history data that has the first sheet identifier associated with the second sheet identifier in the output history storing unit, the steps being carried out by the image forming apparatus.

By this method, the image forming apparatus performs copying only when copying is allowed in accordance with the copying propriety data as to the printed document. The copying propriety data is recorded on the information recording medium attached to the original paper sheet. When copying is actually performed, the correspondence between the original paper sheet and the paper sheet on which copying is performed can be checked by referring to the output history data.

The above objects of the present invention are also achieved by a method of managing a printed document, using a printed document managing system that comprises an image forming apparatus that includes a first reading unit that reads information recorded on an information recording medium attached to an original paper sheet and a second reading unit that reads information recorded on an information recording medium attached to a paper sheet on which copying is to be performed, an output history storing unit that records an output history having each document identifier associated with a sheet identifier, and an usage authorization data storing unit that records the user identifier of each user who has the authorization of use with respect to each document identifier. This method includes the steps of: acquiring the user identifier of a user who wishes a copying operation; reading a first sheet identifier recorded on the information recording medium attached to the original paper sheet, using the first reading unit; identifying a document identifier based on the first sheet identifier, using the output history storing unit; determining whether the user has the authorization of use, based on the acquired user identifier and the identified document identifier; when the user has the authorization of use, reading a second sheet identifier recorded on the information recording medium attached to the paper sheet on which copying is to be performed, using the second reading unit; forming an image on the paper sheet on which copying is being performed, based on the image of the original paper sheet; and recording output history data that has the first sheet identifier associated with the second sheet identifier in the output history storing unit, the steps being carried out by the printed document managing system.

By this method, a user who does not have the authorization to copy the information printed on a paper sheet can be prohibited from copying the information. When copying is actually performed, the correspondence between the original paper sheet and the paper sheet on which copying is performed can be checked by referring to the output history data.

The above objects of the present invention are also achieved by a method of managing a printed document, using an image forming apparatus that includes a first reading unit that reads information recorded on an information recording medium attached to an original paper sheet and a second reading unit that reads information recorded on an information recording medium attached to a paper sheet on which copying is to be performed, and a printed document managing server that includes an output history storing unit that records an output history having each document identifier associated with a sheet identifier and a usage authorization data storing unit that records the user identifier of each user who has the authorization of use with respect to each document identifier. This method includes the steps of: acquiring the user identifier of a user who wishes a copying operation, and a first sheet identifier recorded on the information recording medium attached to the original paper sheet, from the image forming apparatus; identifying a document identifier based on the first sheet identifier, using the output history storing unit; determining whether the user has the authorization of use, based on the acquired user identifier and the identified document identifier, and then transmitting copying propriety data; and acquiring a second sheet identifier recorded on the information recording medium attached to the paper sheet on which copying is being performed, and then recording output history data that has the first sheet identifier associated with the second sheet identifier in the output history storing unit, the steps being carried out by the printed document managing server.

By this method, a user who does not have the authorization to copy the information printed on a paper sheet can be prohibited from copying the information. When copying is actually performed, the correspondence between the original paper sheet and the paper sheet on which copying is performed can be checked by referring to the output history data.

The above objects of the present invention are also achieved by a method of managing a printed document, using an image forming apparatus that includes a reading unit that reads information recorded on an information recording medium attached to a paper sheet on which printing is to be performed and a writing unit that writes information on the information recording medium attached to the paper sheet on which printing is to be performed, and an output history storing unit that records an output history. This method includes the steps of: receiving electronic data of a document for which printing is requested; reading a sheet identifier recorded on the information recording medium attached to the paper sheet on which printing is to be performed; forming an image on the paper sheet on which printing is being performed, based on the electronic data; recording information for identifying the printed document on the information recording medium attached to the paper sheet on which printing is being performed; and recording output history data that has the sheet identifier associated with the information for identifying the printed document in the output history storing unit, the steps being carried out by the image forming apparatus.

By this method, a printed document can be identified based on the information recorded on the information recording medium attached to the paper sheet on which the document is printed. Further, the paper on which the document is printed can be identified based on the output history recorded in the output history storing unit.

The above method may further include the step of determining whether printed information tracing management is necessary, based on data concerning whether the printed information tracing management is necessary, the data being extracted from a tracing management data storing unit based on the document identifier of the document for which printing is requested, the step being carried out by the image forming apparatus, using the tracing management data storing unit that records each document identifier associated with the data concerning whether the tracing management is necessary for each corresponding printed document, the step of recording the information for identifying the printed document and the step of recording the output history data being carried out based on the data concerning whether the tracing management is necessary.

In this manner, tracing management can be performed when necessary.

The above method may further include the step of recording data concerning whether copying is allowed on the information recording medium attached to the paper sheet on which printing is being performed, the data being extracted from a copying propriety data storing unit based on the document identifier of the printed document, the step being carried out by the image forming apparatus, using the copying propriety data storing unit that records each document identifier associated with the data concerning whether copying is allowed with respect to each corresponding printed document.

In this manner, whether copying is allowed can be determined in accordance with the data concerning the propriety of copying. The data is recorded on the information recording medium attached to the paper sheet on which the subject document is printed.

The above method may further include the step of attaching the information recording medium to the paper sheet on which the image is to be formed, the step being carried out by the image forming apparatus.

In this manner, an information recording medium can be attached to a normal paper sheet to which an information recording medium has not been attached in advance.

In the above method, the information recording medium may be a wireless IC chip.

In this manner, the original paper sheet can be identified in accordance with the information recorded in a wireless IC chip.

The above objects of the present invention are also achieved by a program for managing a printed document, using an image forming apparatus that includes a first reading unit that reads information recorded on an information recording medium attached to an original paper sheet and a second reading unit that reads information recorded on an information recording medium attached to a paper sheet on which copying is to be performed, an output history storing unit that records an output history, and a computer. This program causes the computer to record output history data having a first sheet identifier associated with a second sheet identifier in the output history storing unit, the first sheet identifier being read with the first reading unit, the second sheet identifier being read with the second reading unit, when receiving a request to transfer the image of the original paper sheet onto the paper sheet on which copying is to be performed.

With this program, the correspondence between the original paper sheet and the paper sheet on which copying is performed can be checked by referring to the output history data during a copying operation. Thus, the printed information as to a document that has been printed on a paper sheet can be traced back.

In the above program, the computer may record the output history data including data concerning the time of the transfer.

In this manner, the time when the transfer is carried out can be checked.

In the above program, the output history data recorded in the output history storing unit may be associated with data concerning a document identifier for identifying the document printed on the original paper sheet.

In this manner, each copied document can be identified.

The above objects of the present invention are also achieved by an image forming apparatus that can be connected to an output history storing unit that records an output history, including: a first reading unit that reads information recorded on an information recording medium attached to an original paper sheet; a second reading unit that reads information recorded on an information recording medium attached to a paper sheet on which copying is to be performed; a first operating unit that reads a first sheet identifier recorded on the information recording medium attached to the original paper sheet, using the first reading unit; a second operating unit that reads a second sheet identifier recorded on the information recording medium attached to the paper sheet on which copying is to be performed, using the second reading unit; a third operating unit that forms an image on the paper sheet on which copying is being performed, based on the image of the original paper sheet; and a fourth operating unit that records output history data that has the first sheet identifier associated with the second sheet identifier in the output history storing unit.

With this image forming apparatus, the correspondence between the original paper sheet and the paper sheet on which copying is performed can be checked by referring to the output history data. Thus, the printed information as to a document that has been printed on a paper sheet can be traced back.

In the above image forming apparatus, the output history data may include data concerning the time when the image is formed, and be recorded together with the time data.

In this manner, the time when an image is formed on the paper sheet on which copying is being performed based on the image of the original paper sheet can be checked.

The above image forming apparatus may further include a recording unit that records the first sheet identifier, read by the first operating unit, on the information recording medium attached to the paper sheet on which copying is being performed.

In this manner, the original paper sheet can be identified based on the first sheet identifier recorded on the information recording medium attached to the paper sheet on which copying is being performed.

The above objects of the present invention are also achieved by an image forming apparatus that can be connected to a printed document managing server that includes an output history storing unit that records an output history and a copying propriety data storing unit that records data concerning the propriety of copying a printed document. This image forming apparatus includes: a first reading unit that reads information recorded on an information recording medium attached to an original paper sheet; a second reading unit that reads information recorded on an information recording medium attached to a paper sheet on which copying is to be performed; a first identifier reading unit that reads a first sheet identifier recorded on the information recording medium attached to the original paper sheet, using the first reading unit, and then transmits the first sheet identifier to the printed document managing server; a receiving unit that receives, from the printed document managing server, the data concerning the propriety of copying extracted from the copying propriety data storing unit based on the first sheet identifier; a second identifier reading unit that reads a second sheet identifier recorded on the information recording medium attached to the paper sheet on which copying is to be performed, using the second reading unit, when copying is allowed in accordance with the data concerning the propriety of copying; an image forming unit that forms an image on the paper sheet on which copying is being performed, based on the image of the original paper sheet; and an output history recording unit that records output history data that has the first sheet identifier associated with the second sheet identifier in the output history storing unit.

With this image forming apparatus, copying is performed only when copying is allowed in accordance with the copying propriety data extracted from the copying propriety data storing unit. When copying is actually performed, the correspondence between the original paper sheet and the paper sheet on which the copying is performed can be checked by referring to the output history data. Thus, the printed information as to a document that has been printed on a paper sheet can be traced back.

The above objects of the present invention are also achieved by an image forming apparatus that can be connected to an output history storing unit that records an output history. This image forming apparatus includes: a first reading unit that reads information recorded on an information recording medium attached to an original paper sheet; a second reading unit that reads information recorded on an information recording medium attached to a paper sheet on which copying is to be performed; a writing unit that writes information on the information recording medium attached to the paper sheet on which copying is to be performed; a first identifier reading unit that reads a first sheet identifier and data concerning the propriety of copying a printed document that are recorded on the information recording medium attached to the original paper sheet, using the first reading unit; a second identifier reading unit that reads a second sheet identifier recorded on the information recording medium attached to the paper sheet on which copying is to be performed, using the second reading unit, and then writes the data concerning the propriety of copying on the information recording medium, using the writing unit, when copying is allowed in accordance with the data concerning the propriety of copying; an image forming unit that forms an image on the paper sheet on which copying is being performed, based on the image of the original paper sheet; and an output history recording unit that records output history data that has the first sheet identifier associated with the second sheet identifier in the output history storing unit.

This image forming apparatus performs copying only when copying is allowed in accordance with the copying propriety data as to the printed document. The copying propriety data is recorded on the information recording medium attached to the original paper sheet. When copying is actually performed, the correspondence between the original paper sheet and the paper sheet on which copying is performed can be checked by referring to the output history data.

The above objects of the present invention are also achieved by an image forming apparatus that can be connected to an output history storing unit that records an output history. This image forming apparatus includes: a reading unit that reads information recorded on an information recording medium attached to a paper sheet on which printing is to be performed; a writing unit that writes information on the information recording medium attached to the paper sheet on which printing is to be performed; a data receiving unit that receives electronic data of a document for which printing is requested; an identifier reading unit that reads a sheet identifier recorded on the information recording medium attached to the paper sheet on which printing is being performed; an image forming unit that forms an image on the paper sheet on which printing is being performed, based on the electronic data; a medium recording unit that records information for identifying the printed document on the information recording medium attached to the paper sheet on which printing is being performed; and an output history recording unit that records output history data that has the sheet identifier associated with the information for identifying the printed document in the output history storing unit.

With this image forming apparatus, a printed document can be identified based on the information recorded on the information recording medium attached to the paper sheet on which the document is printed. Further, the paper on which the document is printed can be identified based on the output history recorded in the output history storing unit.

This image forming apparatus may be further connected to a tracing management data storing unit that records each document identifier associated with data concerning whether tracing management is necessary for each corresponding printed document. This image forming apparatus may further include a determining unit that determines whether printed information tracing management is necessary, based on the data concerning whether the printed information tracing management is necessary, the data being extracted from the tracing management data storing unit based on the document identifier of the document for which printing is requested. The recording of the information for identifying the printed document and the recording of the output history data are performed based on the data concerning whether the tracing management is necessary.

With this image forming apparatus, tracing management can be performed when necessary.

This image forming apparatus may be further connected to a copying propriety data storing unit that records each document identifier associated with data concerning whether copying is allowed with respect to each corresponding printed document. This image forming apparatus may further include a recording unit that records the data concerning whether copying is allowed on the information recording medium attached to the paper sheet on which printing is being performed, the data being extracted from the copying propriety data storing unit based on the document identifier of the printed document.

In this image forming apparatus, whether copying is allowed can be determined in accordance with the data concerning the propriety of copying. The data is recorded on the information recording medium attached to the paper sheet on which the subject document is printed.

This image forming apparatus may further include a medium attaching unit that attaches the information recording medium to the paper sheet on which the image is to be formed.

In this image forming apparatus, an information recording medium can be attached to a normal paper sheet to which an information recording medium has not been attached in advance.

In this image forming apparatus, the information recording medium may be a wireless IC chip.

In this image forming apparatus, the original paper sheet can be identified in accordance with the information recorded in a wireless IC chip.

The above objects of the present invention are also achieved by a printed document managing system that includes: an image forming apparatus that includes a first reading unit that reads information recorded on an information recording medium attached to an original paper sheet and a second reading unit that reads information recorded on an information recording medium attached to a paper sheet on which copying is to be performed; an output history storing unit that records an output history having each document identifier associated with a sheet identifier; an usage authorization data storing unit that records the user identifier of each user who has the authorization of use with respect to each document identifier; an user identifier acquiring unit that acquires the user identifier of a user who wishes a copying operation; a first identifier reading unit that reads a first sheet identifier recorded on the information recording medium attached to the original paper sheet, using the first reading unit; a document identifying unit that identifies a document identifier based on the first sheet identifier, using the output history storing unit; an authorization determining unit that determines whether the user has the authorization of use, based on the acquired user identifier and the identified document identifier; a second identifier reading unit that reads a second sheet identifier recorded on the information recording medium attached to the paper sheet on which copying is being performed, using the second reading unit, when the user has the authorization of use; an image forming unit that forms an image on the paper sheet on which copying is being performed, based on the image of the original paper sheet; and an output history recording unit that records output history data that has the first sheet identifier associated with the second sheet identifier in the output history storing unit.

With this system, a user who does not have the authorization to copy the information printed on a paper sheet can be prohibited from copying the information. When copying is actually performed, the correspondence between the original paper sheet and the paper sheet on which copying is performed can be checked by referring to the output history data.

The above objects of the present invention are also achieved by a program for managing a printed document, using an image forming apparatus that includes a first reading unit that reads information recorded on an information recording medium attached to an original paper sheet and a second reading unit that reads information recorded on an information recording medium attached to a paper sheet on which copying is to be performed, and a printed document managing server that includes an output history storing unit that records an output history having each document identifier associated with a sheet identifier and an usage authorization data storing unit that records the user identifier of each user who has the authorization of use with respect to each document identifier. This program causes the printed document managing server to: acquire the user identifier of a user who wishes a copying operation, and a first sheet identifier recorded on the information recording medium attached to the original paper sheet, from the image forming apparatus; identify a document identifier based on the first sheet identifier, using the output history storing unit; determine whether the user has the authorization of use, based on the acquired user identifier and the identified document identifier, and then transmit copying propriety data; acquire a second sheet identifier recorded on the information recording medium attached to the paper sheet on which copying is being performed, and then record output history data that has the first sheet identifier associated with the second sheet identifier in the output history storing unit.

In accordance with this program, a user who does not have the authorization to copy the information printed on a paper sheet is prohibited from copying the information. When copying is actually performed, the correspondence between the original paper sheet and the paper sheet on which copying is performed can be checked by referring to the output history data.

The above and other objects, features, and advantages of the present invention will become more apparent from the following detailed description taken in conjunction with the accompanying drawings.

DESCRIPTION OF THE PREFERRED EMBODIMENTS

First Embodiment

The following is a description of a first embodiment of the present invention, with reference to FIGS. 1 through 5. This embodiment is described as a printed document managing method for managing information printed on paper sheets, a printed document managing program, an image forming apparatus, and a printed document managing system. In this embodiment, information printed on paper sheets is to be managed.

Figure 1:
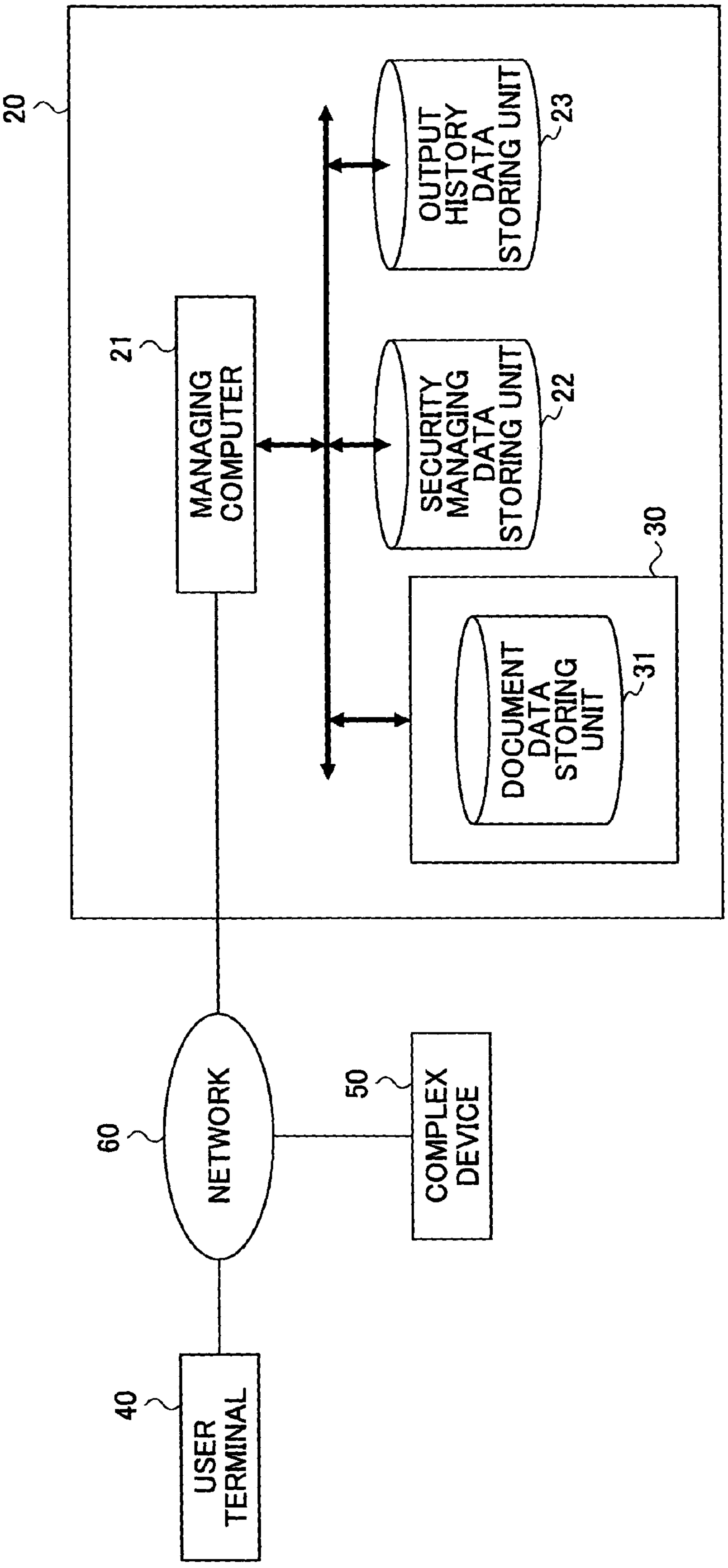
FIG. 1 is a schematic view of a system in accordance with first and second embodiments of the present invention.

In this embodiment, a user terminal 40 and a complex device 50 as an image forming apparatus are connected to a print managing system 20 via a network 60, as shown in FIG. 1.

The user terminal 40 is a computer terminal to be used by a user, and has functions of transmitting data via a network and displaying the contents of received data. The user terminal 40 includes a CPU (not shown), a RAM (not shown), a ROM (not shown), a keyboard, an input device such as a mouse, an output device such as a display, and a communication device such as a modem. The user terminal 40 is used to make a request to the print managing system 20 to display or print out an electronic document.

The complex device 50 is an image forming apparatus that has a printing function and a copying function. Therefore, the complex device 50 includes a printer engine, an original image reading unit, a control unit (CPU), a storing unit (RAM and ROM), a communication device, a display device, and an input device (all of which are not shown).

The complex device 50 can perform printing on a paper sheet that is equipped with a wireless IC chip as an information recording medium (a wireless IC chip paper sheet). This wireless IC chip is a microchip that includes a small wireless communication unit. In this embodiment, paper sheet IDs as sheet identifiers for identifying paper sheets are recorded beforehand in the wireless IC chip. The complex device 50 has a sheet tray on which the wireless IC chip paper sheets are set, as well as a sheet tray on which normal paper sheets are set. The complex device 50 also includes a transporting unit that transports those paper sheets. The complex device 50 further includes a second reading unit that reads the information from the wireless IC chips attached to paper sheets on which printing is to be performed (or copying is to be performed). The complex device 50 further includes a first reading unit that reads the information from the wireless IC chips attached to paper sheets on which original images are printed.

The complex device 50 also includes a first unit, a second unit, a third unit, and a fourth unit that performs later described operations (including first-step, second-step, third-step, and fourth-step operations).

The print managing system 20 is a computer system that manages print information. This print managing system 20 performs various operations, while communicating with the user terminal 40 and the complex device 50 via the network 60. The print managing system 20 includes a managing computer 21 as shown in FIG. 1.

The managing computer 21 performs data transmission and reception with the user terminal 40 or the complex device 50, and also performs operations to manage data as to various kinds of information. The managing computer 21 includes a CPU, a RAM, and a ROM (all of which are not shown), and performs later described operations. The managing computer 21 executes a printed document managing program for performing the later described operations.

A security managing data storing unit 22, an output history data storing unit 23, and an original property guaranteeing electronic saving device 30 are connected to the managing computer 21. The security managing data storing unit 22 serves as a copying propriety data storing unit and a usage authority data storing unit.

The original property guaranteeing electronic saving device 30 is a known device for securing and saving the original property of each electronic document. The original property guaranteeing electronic saving device 30 includes a document data storing unit 31 that records document data. The original property guaranteeing electronic saving device 30 also includes an electronic signature providing unit that provides an electronic signature on each electronic document utilizing a public key encryption technique. The original property guaranteeing electronic saving device 30 provides an electronic signature by the public key encryption technique on each electronic document to be saved with original property, and stores each electronic document with an electronic signature in the document data storing unit 31.

Figure 2:
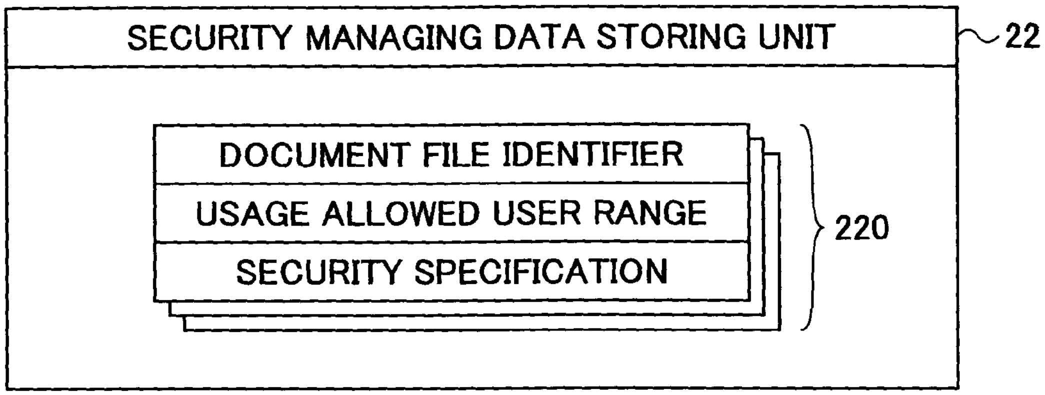
FIG. 2 illustrates the data that is stored in the security managing data storing unit.
Figure 3:
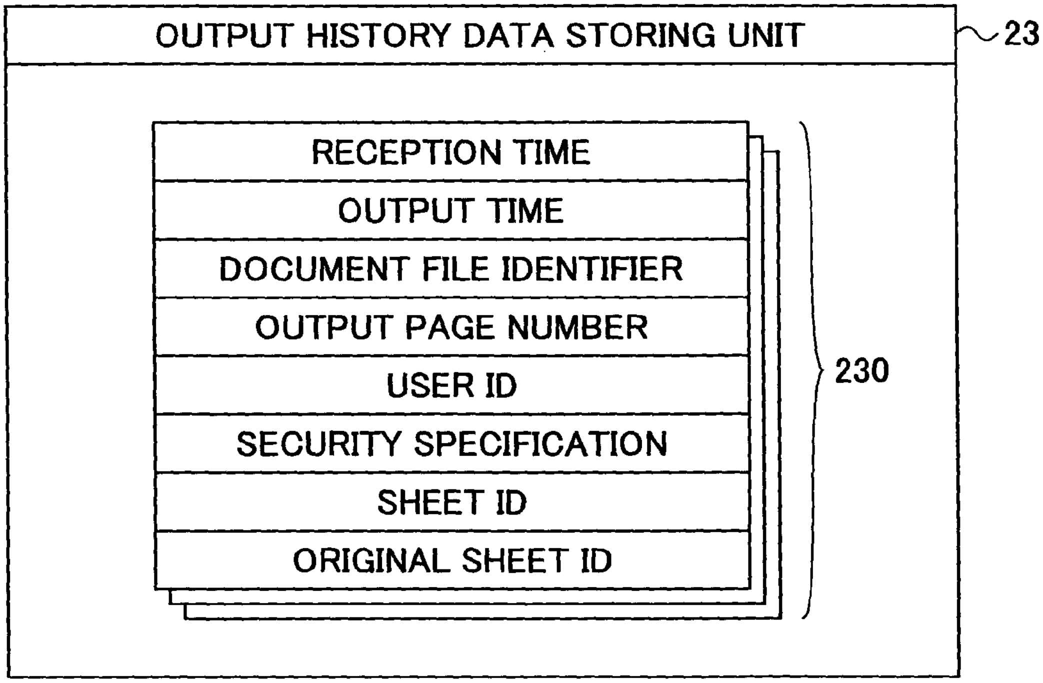
FIG. 3 illustrates the data that is stored in the output history data storing unit.

The security managing data storing unit 22 has security managing data 220 recorded in each document file stored in the original property guaranteeing electronic saving device 30, as shown in FIG. 2. The security managing data 220 is recorded when a document file is recorded in the original property guaranteeing electronic saving device 30. The security managing data 220 includes data concerning a document file identifier as a document identifier, a usage allowed user range, and a security specification.

The data concerning the identifier for identifying the document file is recorded in the document file identifier data region.

The data concerning the range of the user identifiers in which the document in the document file can be printed is recorded in the usage allowed user range data region. If two or more users are allowed to print out the document, two or more user identifiers are recorded in the usage allowed user range data region. If the first digit of a user identifier is a particular code and printing is allowed, the particular code is recorded in the usage allowed user range data region. In such a case, all the users who have user identifiers including the particular code in the first digits are allowed to print out the document.

The data concerning the security specification for printing the document file is recorded in the security specifying data region. In this embodiment, the security specifying data includes "printed information security management required/copying prohibited", "printed information security management required/copying allowed", or "printed information security management not required".

If the security specifying data indicates "printed information security management required/copying prohibited", security management is performed on the information printed on the paper sheet, and copying of the printed information is prohibited. Here, the "security management" is to manage outputting of the document onto a paper sheet and manage the document printed on the paper sheet. If the security specifying data indicates "printed information security management required/copying allowed", the security management is performed on the information printed on a paper sheet, and copying of the information printed on the paper sheet is allowed. If the security specifying data indicates "printed information security management not required", the security management is not performed on the information printed on a paper sheet.

In the output history storing unit 23, output history data 230 is recorded for each output (printing or copying) of a document on which the security management is to be performed.

The output history data 230 is recorded when output history data is received from the complex device 50. The output history data 230 includes data concerning a reception time, an output time, a document file identifier, an output page number, a user ID, a security specification, a sheet ID, and an original sheet ID.

The data concerning the time (hour/minute/second, day/month/year) when the complex device 50 receives the printed data of an electronic document recorded in the document data storing unit 31 from the print managing system 20 is recorded in the reception time data region. In the case of a copying operation, the data concerning the reception time is not recorded.

The data concerning the time (hour/minute/second, day/month/year) when the complex device 50 outputs the document onto a paper sheet is recorded in the output time data region. For example, in the case of a printing operation, the time when an image is formed on a paper sheet based on the electronic data (print data) provided through a printing request is recorded as the output time. Meanwhile, in the case of a copying operation, the time when an image is formed on a paper sheet based on the image data read from an original (an original paper sheet) is recorded as the output time.

The data concerning the document file identifier of a document file output onto a paper sheet is recorded in the document file identifier data region.

The data concerning the output page number of the document file is recorded in the output page data region.

The data concerning the user ID of the user who has made a printing request or a copying request is recorded in the user ID data region.

In the security specifying data region, the data concerning the security specification for the printed information in the output document file is recorded based on the security specification specified in the security managing data 220.

The data concerning the sheet ID of the sheet onto which the document is output is recorded in the sheet ID data region. In the case of a copying operation, the data concerning the sheet ID of the paper sheet on which copying is to be performed is recorded in the sheet ID data region.

The data concerning the sheet ID of the original paper sheet is recorded in the original sheet ID data region. The original sheet ID data is recorded only in the case of a copying operation.

In this embodiment, the managing computer 21, the security managing data storing unit 22, and the output history data storing unit 23 function as a printed document managing server. Also, the managing computer 21, the security managing data storing unit 22, the output history storing unit 23, and the complex device 50 function as a printed document managing system.

Figure 4:
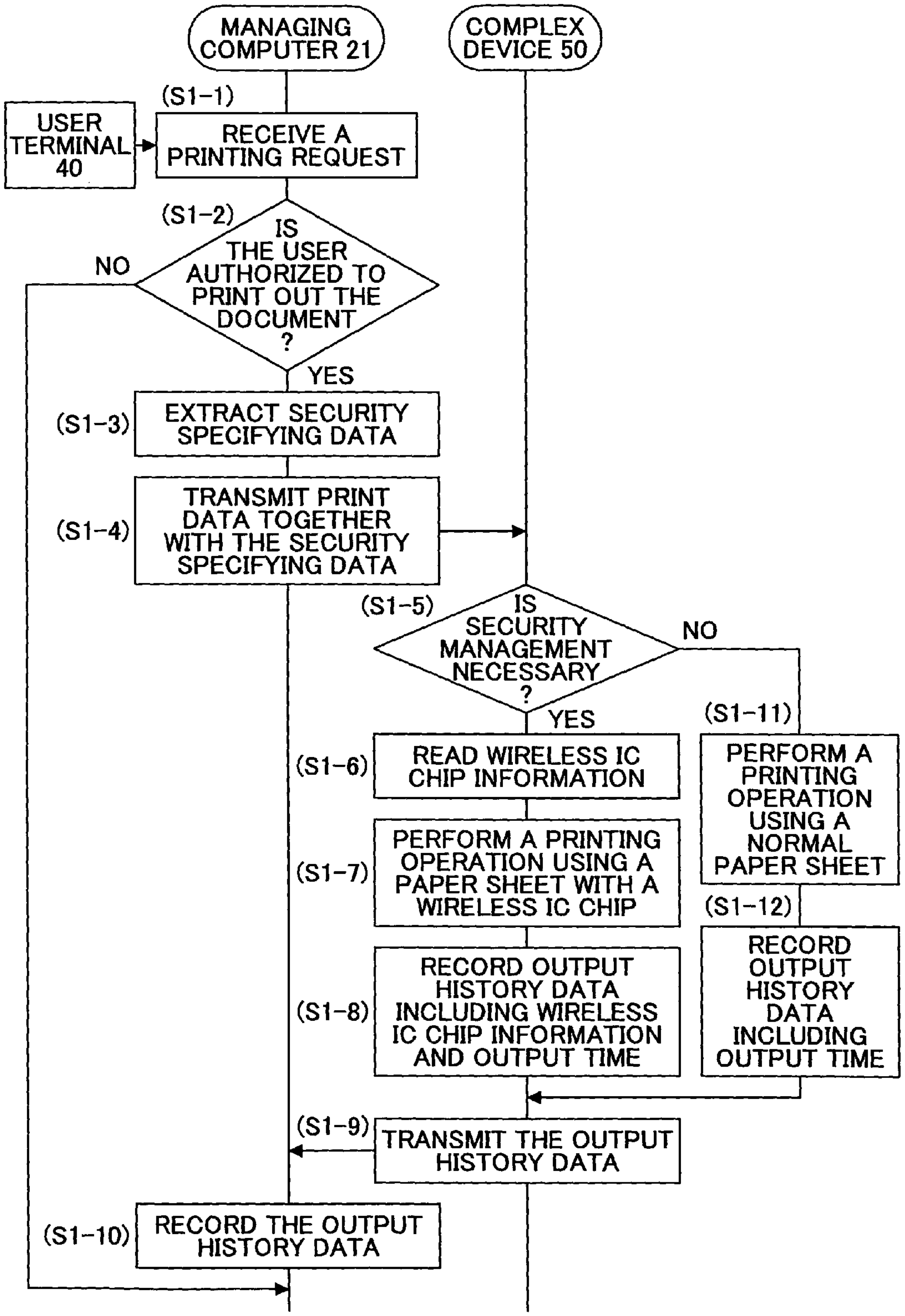
FIG. 4 illustrates a printing operation in accordance with the first and second embodiments of the present invention.
Figure 5:
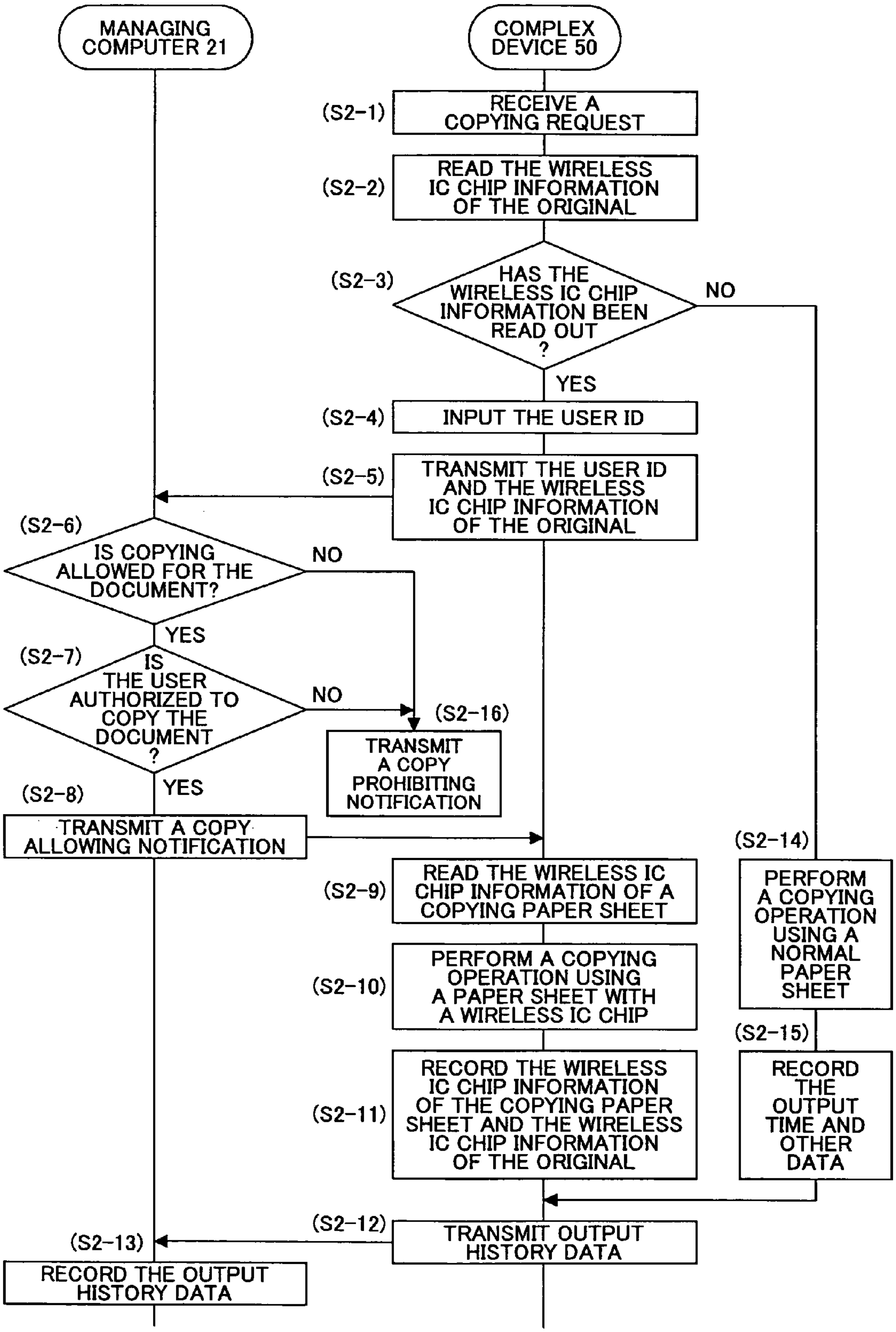
FIG. 5 illustrates a copying operation in accordance with the first and second embodiments of the present invention.

Referring now to FIGS. 4 and 5, the operation of performing printed information security management using the above system is described below. In the following, a printing operation (FIG. 4) based on print data is described separately from a copying operation (FIG. 5) of an original.

<Printing Operation Based on Print Data>

First, referring to FIG. 4, the operation of performing a printing operation based on electronic data (print data) is described.

A user who wishes to print out a document file recorded in the document data storing unit 31 of the original property guaranteeing electronic saving device 30 first uses his/her user ID to access the original property guaranteeing electronic saving device 30 through the user terminal 40. The user then makes a printing request, specifying a document file and a page (or pages) to be printed out. The user terminal 40 transmits the data concerning the document file and the page(s) and the printing request including the user ID to the print managing system 20.

The managing computer 21 of the print managing system 20 receives the printing request via the network 60 (step S1-1). Here, the managing computer 21 determines whether printing is allowed (step S1-2). More specifically, the managing computer 21 extracts the security managing data 220 from the security managing data storing unit 22 based on the document file identifier. The managing computer 21 then detects the usage allowed user range contained in the security managing data 220. The managing computer 21 further determines whether the user ID contained in the printing request is contained in the detected user range. Thus, whether the user who has made the printing request is authorized to perform printing is determined.

If the user who has made the printing request is authorized to perform printing ("YES" in step S1-2), the managing computer 21 extracts the data concerning the security specification from the extracted security managing data 220 (step S1-3). The managing computer 21 adds the data concerning the security specification, and transmits the print data concerning the document file for which the printing request has been made to the complex device 50 (step S1-4). More specifically, the managing computer 21 first converts the document file, for which the printing request has been made, into print data through a printer driver provided in the managing computer 21. The managing computer 21 then adds the data concerning the security specification and the data concerning the document file identifier, the output page number, and the user ID to the print data, and transmits the data to the complex device 50.

The complex device 50, which receives the print data, examines the data concerning the security specification added to the received print data (step S1-5). If the data concerning the security specification indicates "security management required" ("YES" in step S1-5), the complex device 50 performs printing, using a paper sheet having a wireless IC chip attached thereto. The complex device 50 then reads the information from the wireless IC chip attached to the paper sheet used in the printing (step S1-6). More specifically, the complex device 50 first pulls out a paper sheet with a wireless IC chip from the tray on which wireless IC chip paper sheets are set. The complex device 50 transports the paper sheet with a wireless IC chip to the reading position in which the second reading unit reads the information from the wireless IC chip.

The complex device 50 performs a printing operation, using the paper sheet with the wireless IC chip from which the wireless IC chip information has been read out (step S1-7). The complex device 50 forms an image on the paper sheet, based on the received print data.

The complex device 50 then records the output history data in the storing unit of the complex device 50 (step S1-8). The output history data includes the data concerning the reception time of the print data received by the complex device 50, the output time, the document file identifier, the output page number, the user ID, the security specification, and the read wireless IC chip information.

The complex device 50 then transmits the output history data, which has been recorded in the storing unit in the complex device 50, to the print managing system 20 (step S1-9). In this embodiment, the output history data is transmitted to the print managing system 20 regularly (every 1 hour, for example).

The managing computer 21 of the print managing system 20, which has received the output history data, then records the output history data 230 in the output history data storing unit 23 (step S1-10). More specifically, the managing computer 21 records the data concerning the reception time, the output time, the document file identifier, the output page number, the user ID, the security specification, and the sheet ID, which are contained in the output history data.

Meanwhile, if the security management is not required for the print data the complex device 50 has received ("NO" in step S1-5), the complex device 50 performs a printing operation, using a normal paper sheet (step S1-11). The complex device 50 then records the output history data including the output time and the likes in the storing unit in the complex device 50 (step S1-12). More specifically, the complex device 50 records the data concerning the reception time, the output time, the document file identifier, the output page number, the user ID, and the security specification. The complex device 50 then transmits the output history data to the print managing system 20 (step S1-9). The managing computer 21 records the output history data 230 in the output history data storing unit 23, based on the received output history data (step S1-10).

If the user who has made the printing request is not authorized to perform printing ("NO" in step S1-2), the managing computer 21 gives the user terminal 40 a notification to that effect, and ends the operation.

<Operation of Copying an Original>

Referring now to FIG. 5, the operation of copying an original (an original paper sheet) is described.

A user who wishes to copy a printed document first places a document-printed original (an original paper sheet) on the document placing surface of the complex device 50. The user then inputs a copying request through the input device of the complex device 50. The complex device 50 receives the input copying request (step S2-1).

The complex device 50 then reads wireless IC chip information as to the original paper sheet (step S2-2). More specifically, the complex device 50 reads wireless IC chip information as to the original paper sheet through the first reading unit. Here, if the paper sheet placed on the document placing surface has a wireless IC chip attached thereto, information is read from the wireless IC chip.

If information is read from the wireless IC chip ("YES" in step S2-3), the complex device 50 performs a receiving operation for the user ID (step S2-4). More specifically, the complex device 50 outputs a message to prompt the user to input the user ID to the display device. In response to that, the user inputs the user ID. The complex device 50 then transmits inquiry data that includes the user ID and the wireless IC chip information as to the original paper sheet to the managing computer 21 (step S2-5).

The managing computer 21, which has received the inquiry data, first determines whether the subject document is allowed to be copied (step S2-6). More specifically, the managing computer 21 searches the output history data storing unit 23, based on the sheet ID received as the wireless IC chip information as to the original paper sheet. The managing computer 21 then extracts the data concerning the document file identifier from the searched output history data 230. Based on the document file identifier, the managing computer 21 extracts the security managing data 220 from the security managing data storing unit 22. The managing computer 21 determines whether the information indicating "security management required/copying allowed" is recorded as the security specification in the security managing data 220.

If the subject document is allowed to be copied ("YES" in step S2-6), the managing computer 21 determines whether the user, who has made the copying request, is authorized to perform copying (step S2-7). More specifically, the managing computer 21 determines whether the user identifier in the inquiry data is contained in the usage allowed user range specified in the security managing data 220 extracted in accordance with the document file identifier.

If the user, who has made the copying request, is authorized to perform copying ("YES" in step S2-7), the managing computer 21 transmits a copy allowing notification to the complex device 50 (step S2-8).

If the subject document is not allowed to be copied ("NO" in step S2-6) or the user is not authorized to perform copying ("NO" in step S2-7), the managing computer 21 transmits a copy prohibiting notification to the complex device 50 (step S2-16). The complex device 50, which has received the copy prohibiting notification, displays a message to that effect on the display device. Here, the complex device 50 does not perform a copying operation.

The complex device 50, which has received the copy prohibiting notification, reads the wireless IC chip information as to the original paper sheet (step S2-9). More specifically, the complex device 50 pulls out a paper sheet having a wireless IC chip attached thereto from the tray on which wireless IC chip paper sheets are set. The complex device 50 then transports the wireless IC chip paper sheet to the reading position in which the second reading unit reads the information from the wireless IC chip.

The complex device 50 then performs a copying operation, using the paper sheet (the paper sheet on which copying is to be performed) having the wireless IC chip from which information has been read out (step S2-10). More specifically, the complex device 50 reads the image printed on the original paper sheet having an IC chip attached thereto, and records the image data. Based on the image data, the complex device 50 transfers the image onto the paper sheet on which copying is to be performed.

The complex device 50 then records the output history data in the storing unit in the complex device 50 (step S2-11). More specifically, the output history data includes the data concerning the output time, the user ID, the wireless IC chip information as to the paper sheet on which copying is to be performed, and the wireless IC chip information as to the original.

The complex device 50 then transmits the output history data recorded in the storing unit in the complex device 50 to the print managing system 20 (step S2-12). In this embodiment, the output history data is transmitted to the print managing system 20 regularly (every 1 hour, for example). The complex device 50 transmits the output history data obtained in the copying operation, together with the output history data obtained in the printing operation, to the print managing system 20.

The managing computer 21 of the print managing system 20, which has received the output history data, records the output history data 230 in the output history data storing unit 23, based on the received output history data (step S2-13). More specifically, the managing computer 21 first detects the subject sheet ID from the output history data storing unit 23, in accordance with the original sheet ID provided as the wireless IC chip information as to the original. The managing computer 21 then extracts the data concerning the document file identifier, the output page number, and the security specification specified in the output history data 230 associated with the detected sheet ID. The managing computer 21 then records the output history data 230 based on the data concerning the document file identifier, the output page number, and the security specification, and the data concerning the received output time, the user ID, the sheet ID, and the original sheet ID.

Meanwhile, if the wireless IC chip information is not read in the process of reading the wireless IC chip information as to the original ("NO" in step S2-3), the complex device 50 performs a copying operation, using a normal paper sheet (step S2-14). More specifically, the complex device 50 selects the tray on which normal paper sheets are set, and performs a copying operation using a normal paper sheet pulled out from the tray.

The complex device 50 then records the output history data in the storing unit in the complex device 50 (step S2-15). More specifically, the complex device 50 records the data concerning the output time and the user ID. The complex device 50 transmits the output history data to the print managing system 20 in step S2-12. The managing computer 21 records the output history data 230 in the output history data storing unit 23, based on the received output history data, in step S2-13.

In accordance with this embodiment, the following effects can be achieved:

In this embodiment, the output history data 230 in which the sheet ID recorded in the wireless IC chip attached to an original paper sheet is associated with the sheet ID recorded in the wireless IC chip attached to a copying paper sheet is recorded. Accordingly, when a copying operation is performed, the correspondence between the original paper sheet and the copying paper sheet can be checked by referring to the output history data 230. Thus, the printed information printed on each paper sheet can be traced back.

In this embodiment, when the security management is required, the complex device 50 that has received print data reads the wireless IC chip information as to a paper sheet on which printing is to be performed through the second reading unit. Based on the print data, the complex device 50 performs a printing operation, and transmits the output history data containing the wireless IC chip information, and the document file identifier to the print managing server. Accordingly, the sheet ID of the printed paper sheet can be recorded in association with the document file identifier. When the paper sheet is copied, the document file identifier is specified by the sheet ID of the original paper sheet. Thus, the document file identifier of the copied document can be specified.

In this embodiment, the managing computer 21 that has received a printing request adds the data concerning the security specification to the print data, and then transmits the print data to the complex device 50. Where printed information management is required, the complex device 50 uses a paper sheet having a wireless IC chip attached thereto, in accordance with the security specification. Accordingly, printing is performed on a wireless IC chip paper sheet only when the printed information management is required in the printing operation. Thus, costs can be lowered.

In this embodiment, when a user ID and wireless IC chip information as to an original are received from the complex device 50 in response to a copying request, the managing computer 21 specifies the security managing data 220, based on the document file identifier specified by the sheet ID of the original. The managing computer 21 then determines whether copying is allowed, based on the data as to the security specification contained in the security managing data 220. Accordingly, copying can be prohibited on documents other than those on which copying is allowed. Thus, improper copying can be avoided.

In this embodiment, when a copying request is made, the security managing data 220 is extracted based on the document file identifier and the user ID specified by the sheet ID of the original. The user ID of the user who has made the copying request is compared with the data concerning the usage allowed user range contained in the security managing data 220, thereby determining whether the user who has made the copying request is authorized to perform copying. Thus, users other than the user who is authorized to copy the information printed on the original document are not allowed to copy the printed information.

Second Embodiment

The following is a detailed description of a second embodiment of the present invention, with reference to FIGS. 4 and 5. In this embodiment, data including a document file identifier is recorded in a wireless IC chip attached to a paper sheet on which an image is to be formed in a printing operation and a copying operation.

In this embodiment, the complex device 50 includes a writing unit that writes information in a wireless IC chip attached to a paper sheet on which printing is to be performed (or a paper sheet on which copying is to be performed). In the security managing data storing unit 22, the data concerning whether the security management is required for tracing the printed information is recorded as the data concerning the security specification. Accordingly, the security managing data storing unit 22 functions as a trace managing data storing unit. The system structure and the structure of the print managing system 20 are the same as those of the first embodiment, and therefore, explanation of them is omitted herein.

Referring to FIGS. 4 and 5, the operation of performing printed information security management using the above system is described below. In the following description, a printing operation based on print data (FIG. 4) is described separately from an operation of copying an original (FIG. 5).

<Printing Operation Based on Print Data>

First, the operation of performing printing based on electronic data (print data) is described with reference to FIG. 4. In the following, only the different procedures from those of the first embodiment are described.

In this embodiment, the complex device 50 forms an image on a paper sheet having a wireless IC chip attached thereto, and writes information in the wireless IC chip attached to the paper sheet in step S1-7. More specifically, the complex device 50 writes the output time, the document file identifier, the output page number, the user ID, and the security specification, into the wireless IC chip attached to the paper sheet through the writing unit.

Other than the procedure of step S1-7, the printing operation is the same as the printing operation in accordance with the first embodiment.

<Operation of Copying an Original>

Referring now to FIG. 5, the operation of copying an original document (an original paper sheet) is described. In the following, only the different procedures from those of the first embodiment are described.

In this embodiment, the complex device 50 reads the data concerning the sheet ID of the original paper sheet, the output time, the document file identifier, the output page number, the user ID, and the security specification, as the wireless IC chip information as to the original document. The complex device 50 then records the read wireless IC chip information in the storing unit.

If the wireless IC chip information as to the original document is read ("YES" in step S2-3), the complex device 50 examines the security specification contained in the wireless IC chip information. If the data indicating "printed information security management required/copying prohibited" is recorded as the security specification, the complex device 50 displays a message to that effect on the display device. In such a case, the complex device 50 does not perform a copying operation.

Meanwhile, if the data indicating "printed information security management required/copying allowed" is recorded as the security specification, the complex device 50 moves on to the procedure of step S2-4. In such a case, the complex device 50 carries out the procedures of steps S2-4 and S2-5 in the same manner as in the first embodiment.

When receiving the user ID and the wireless IC chip information as to the original document, the managing computer 21 skips the procedure of step S2-6, and determines whether the user is authorized to copy the document in the same manner as in the first embodiment (step S2-7). If the user is not authorized to copy the document ("NO" in step S2-7), the managing computer 21 transmits a copy prohibiting notification to the complex device 50 (step S2-16).

If the user is authorized to copy the document ("YES" in step S2-7), the managing computer 21 and the complex device 50 carry out the procedures of step S2-8 and later. In step S2-10, the complex device 50 records the wireless IC chip information as to the original document in the wireless IC chip attached to the paper sheet on which copying is to be performed. More specifically, the data concerning the sheet ID of the paper sheet on which copying is to be performed, the output time, the document file identifier, the output page number, the user ID, and the security specification read out from the wireless IC chip attached to the original paper sheet, is recorded in the wireless IC chip attached to the paper sheet on which copying is to be performed.

In accordance with the above described second embodiment, the following effects as well as the effects of the first embodiment can be achieved.

In this embodiment, the data concerning the output time, the document file identifier, the output page number, the user ID, and the security specification, is written in the wireless IC chip attached to a paper sheet on which printing is to be performed in a printing operation. Accordingly, the data concerning the output time, the document file identifier, the output page number, the user ID, and the security specification of a printed document can be obtained, without access to the print managing system 20. Thus, the communication load can be reduced.

Further, the output history data 230 containing the above data and the sheet ID of the printing paper sheet are recorded in the output history data storing unit 23. Accordingly, the printed document and the paper sheet on which the document is printed can be identified by the data concerning the document file identifier, the output page number, and the sheet ID of the output history data 230 recorded in the output history data storing unit 23, without reference to the wireless IC chip information as to the paper sheet.

In this embodiment, the data concerning the output time of the original paper sheet, the document file identifier, the output page number, the user ID, and the security specification, which are read from the wireless IC chip attached to the original paper sheet, is written in the wireless IC chip attached to the paper sheet on which copying is to be performed in a copying operation. Accordingly, the sheet ID of the original paper sheet and the output time of the original paper sheet can be identified in association with the paper sheet on which copying is to be performed, without access to the print managing system 20. Also, the data concerning the document file identifier, the output page number, the user ID, and the security specification as to the copied document can be obtained without access to the print managing system 20. Thus, the communication load can be reduced.

In this embodiment, the data concerning the security specification extracted from the security managing data storing unit 22 is written in the wireless IC chip attached to the paper sheet on which printing is to be performed in a printing operation. When a copying request is made and the data concerning the security specification read in from the wireless IC chip attached to the original paper sheet indicates "printed information security management required/copying prohibited", a copy prohibiting message is displayed, and a copying operation is not performed. Accordingly, every time a copying request is made, whether copying is allowed can be determined based on the data concerning the propriety of copying recorded in the wireless IC chip attached to the original paper sheet. If copying is prohibited, a copying operation can be rejected, without access to the print managing system 20. Thus, the communication load can be reduced.

In this embodiment, the data concerning the security specification is examined in step S1-5. If security management is required, a printing operation is performed using a paper sheet having a wireless IC chip attached thereto, and the data concerning the document file identifier, the output page number, and the like is written in the wireless IC chip attached to the paper sheet. In such a case, the data containing the document file identifier, the output page number, and the sheet ID contained in the read wireless IC chip information is further recorded as the output history data.

If a security specification is required (trace management is required), the printed information can be traced back. In such a case, the printed document can be identified by the document file identifier and the output page number of the printed document based on the wireless IC chip information as to the printed paper sheet, without access to the print managing system 20. Further, the printed document and the paper sheet on which the document is printed can be identified by the data concerning the document file identifier, the output page number, and the sheet ID contained in the output history data 230 recorded in the output history data storing unit 23, without reference to the wireless IC chip information as to the paper sheet.

The above embodiments may be modified as follows.

In the first and second embodiments, the sheet ID is recorded beforehand in the wireless IC chip attached to the subject paper sheet, and the data concerning the sheet ID is read out and recorded in a printing operation and a copying operation. In addition to that, the data concerning the sheet ID may be written in the wireless IC chip of the paper sheet by the writing unit of the complex device 50 in the printing operation and the copying operation.

In the first and second embodiments, a printing operation and a copying operation are performed using a paper sheet to which a wireless IC chip is attached beforehand. Instead of that, a wireless IC chip in which the sheet ID is recorded may be attached to a paper sheet on which printing is to be performed during a printing operation and a copying operation, and the information contained in the wireless IC chip is then read out and recorded. Accordingly, it becomes unnecessary to prepare paper sheets to which wireless IC chips are attached beforehand.

In such a case, only when the information printed on the subject paper sheet needs to be managed, a wireless IC chip can be attached to the paper sheet. In this manner, unnecessary use of wireless IC chips can be avoided. Also, it becomes unnecessary to prepare paper sheets with wireless IC chips separately from normal paper sheets.

In the first and second embodiments, the managing computer 21 in a copying operation records the output history data 230 including the data concerning the document file identifier extracted in accordance with the sheet ID of the original document, the page number, and the security specification, in the output history data storing unit 23. Alternatively, the data concerning the document file identifier, the output page number, and the security specification may not be recorded in the output history data 230 in a copying operation, and may be extracted based on the output history data 230 as to the original paper sheet when the output history data 230 is searched. More specifically, the output history data 230 of the paper sheet on which copying is to be performed is first identified by the sheet ID of the original paper sheet, and the sheet ID of the original paper sheet is extracted. The data concerning the document file identifier, the page number, and the security specification contained in the output history data 230 having the sheet ID of the original paper sheet as the sheet ID is extracted. By doing so, the data amount to be recorded in the output history data storing unit 23 can be reduced.

In the first and second embodiments, when a document with which printed information security management is required in accordance with the data concerning the security specification contained in the security managing data 220 is to be printed out, a paper sheet having a wireless IC chip attached thereto is used. When a copying operation is to be performed using a paper sheet with a wireless IC chip as the original paper sheet, copying must be performed on a paper sheet having a wireless IC chip attached thereto. In a printing operation, on the other hand, a paper sheet having a wireless IC chip attached thereto may be used, regardless of whether printed information security management is required. In such a case, the output history data 230 is recorded in the output history data storing unit 23 only when the printed information security management is necessary. In a copying operation, even if the original is a paper sheet having a wireless IC chip attached thereto, whether printed information security management is required is determined. The output history data 230 is recorded in the output history data storing unit 23 only if the printed information security management is necessary. In this manner, it becomes unnecessary to prepare paper sheets with wireless IC chips separately from normal paper sheets.

In the first and second embodiments, the propriety of copying is determined based on the data concerning the security specification stored in the security managing data storing unit 22 in a copying operation. Alternatively, copying may not be restricted. In such a case, the sheet ID of the original paper sheet is also associated with the sheet ID of the paper sheet on which copying is to be performed, and the output history data 230 is then recorded. In this manner, the original paper sheet can be identified, even if copying is not restricted. Thus, the information printed on the paper sheet can be traced back.

In the first and second embodiments, when a printed request is made through the user terminal 40, the managing computer 21 adds the data concerning the security specification to print data, and transmits the print data to the complex device 50. Based on the data concerning the security specification, the complex device 50 selects the tray on which paper sheets are set. Alternatively, when a printing request is made through the user terminal 40, the managing computer 21 may select the tray on which the corresponding paper sheets are set based on the data concerning the security specification, and then transmit the print data to the complex device 50. In this manner, the processing load on the complex device 50 is reduced, and the printed document managing method of the present invention can be realized.

In the first and second embodiments, the print managing system 20 includes the security managing data storing unit 22 and the output history data storing unit 23. Alternatively, the security managing data storing unit 22 and the output history data storing unit 23 may be provided in the complex device 50. In this manner, printed information can be managed, without communication with the print managing system 20.

In the first and second embodiments, a wireless IC chip is used as a sheet information recording unit. However, the storing unit to be attached to each paper sheet is not limited to that. For example, a display code such as a bar code or a two-dimensional code may be used as a means of recording sheet information. In such a case, each sheet ID is printed in advance with an ink of an inconspicuous color. A sensor for sensing the inconspicuous color is provided as a reading unit for sheet IDs in the complex device 50.

In a printing operation, a display code indicating a sheet ID may be printed on a paper sheet with an ink of a special color. In such a case, the data concerning the sheet ID of the original is recorded in the display code. In a copying operation, the sheet ID of the original is identified by the display code, and the output history data 230 is extracted. Also, the display code is not copied on the paper sheet on which copying is performed, and a display code indicating a new sheet ID is printed. More specifically, in a copying operation, the complex device 50 reads the image of the original paper sheet, and spots the portion on which a display code is printed. The complex device 50 then converts the spotted portion into the image of a display code indicating a new sheet ID. The image of the original having the display code replaced with the new display code is printed on the paper sheet on which copying is being performed. By doing so, the information printed on a copying paper sheet can be traced back using the display code, even when the copying paper sheet is a normal paper sheet.

In a copying operation, the information for identifying the original paper sheet may be recorded as the display code information for the paper sheet on which copying is being performed. By doing so, the original paper sheet of the image copied on the copying paper sheet can be identified, without access to the print managing system 20.

In the second embodiment, in a copying operation, the data concerning the security specification read out from the wireless IC chip attached to the original paper sheet is recorded as the security specification for the paper sheet on which copying is being performed. Alternatively, in a copying operation, the data indicating that copying is prohibited may be recorded in the wireless IC chip attached to the paper sheet on which copying is being performed, regardless of the security specification contained in the wireless IC chip information as to the original. In such a case, when a copying request is made using the copying paper sheet as an original, copying is rejected based on the copy prohibiting data contained in the wireless IC chip information as to the copying paper sheet. Accordingly, further copying of the copying paper sheet can be prevented. Thus, paper sheets on which printing is performed based on print data (original paper sheets) can be copied, but copying of copied information can be prevented.

In the second embodiment, in a copying operation, the sheet ID of the original is written in the wireless IC chip attached to the paper sheet on which copying is being performed. However, the data to be written in the wireless IC chip attached to a paper sheet on which copying is being performed is not limited to that. For example, when copying is repeatedly performed, the sheet ID of a paper sheet on which printing has been performed based on print data (an original paper sheet) may be written in the wireless IC chip attached to the paper sheet on which copying is being performed. By doing so, even when copying is repeated, the original paper sheet can be identified by the sheet ID of the original sheet contained in the wireless IC chip information as to the paper sheet in search, without access to the print managing system 20.

It should be noted that the present invention is not limited to the embodiments specifically disclosed above, but other variations and modifications may be made without departing from the scope of the present invention.

This patent application is based on Japanese Priority Patent Application No. 2004-030712, filed on Feb. 6, 2004, the entire contents of which are hereby incorporated by reference.

What is claimed is:

1. A method of managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, an output history storing unit that records an output history, and a computer, the method comprising the step of:

when the computer receives a request to transfer an image of the original paper sheet onto the paper sheet on which copying is to be performed, recording output history data including a first sheet identifier, a second sheet identifier, a reception time comprising the time that the image of the original paper sheet is received, and an output time comprising the time of the transfer of the image of the original paper sheet onto the paper sheet on which copying is performed in the output history storing unit, the first sheet identifier being read with the first reading unit, the second sheet identifier being read with the second reading unit, the recording being performed by the computer.

2. The method as claimed in claim 1, wherein the output history data recorded in the output history storing unit further includes a document identifier for identifying the document printed on the original paper sheet.

3. The method as claimed in claim 1, further comprising the step of:

attaching the information recording medium to the paper sheet on which the image is to be formed, the step being carried out by the image forming apparatus.

4. The method as claimed in claim 1, wherein the information recording medium is a wireless IC chip.

5. A method of managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, and an output history storing unit that records an output history, the method comprising the steps of:

reading a first sheet identifier recorded on the information recording medium attached to the original paper sheet, using the first reading unit;

reading a second sheet identifier recorded on the information recording medium attached to the paper sheet on which copying is to be performed, using the second reading unit;

forming an image on the paper sheet on which copying is being performed, based on an image of the original paper sheet; and recording output history data including the first sheet identifier, the second sheet identifier, a reception time comprising the time that the image of the original paper sheet is received, and an output time comprising the time when the image is formed on the paper sheet on which copying is being performed in the output history storing unit, the steps being carried out by the image forming apparatus.

6. The method as claimed in claim 5, further comprising the step of: recording the first sheet identifier on the information recording medium attached to the paper sheet on which copying is being performed, the step being carried out by the image forming apparatus.

7. A method of managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, and a printed document managing server that includes an output history storing unit that records an output history and a copying propriety data storing unit that records data concerning the propriety of copying a printed document, the method comprising the steps of:

reading a first sheet identifier recorded on the information recording medium attached to the original paper sheet, using the first reading unit, and transmitting the first sheet identifier to the printed document managing server;

receiving, from the printed document managing server, the data concerning the propriety of copying extracted from the copying propriety data storing unit based on the first sheet identifier;

when copying is allowed in accordance with the data concerning the propriety of copying, reading a second sheet identifier recorded on the information recording medium attached to the paper sheet on which copying is to be performed, using the second reading unit; and forming an image on the paper sheet on which copying is being performed, based on an image of the original paper sheet; and recording output history data that has the first sheet identifier associated with the second sheet identifier in the output history storing unit, the steps being carried out by the image forming apparatus, wherein when copying is prohibited in accordance with the data concerning the propriety of copying, a copying operation is rejected.

8. A method of managing a printed document, using an image forming apparatus that includes a first reading unit that reads information recorded on an information recording medium attached to an original paper sheet, a second reading unit that reads information recorded on an information recording medium attached to a paper sheet on which copying is to be performed, and a writing unit that writes information on the information recording medium attached to the paper sheet on which copying is to be performed, and an output history storing unit that records an output history, the method comprising the steps of:

reading a first sheet identifier and data concerning the propriety of copying a printed document that are recorded on the information recording medium attached to the original paper sheet, using the first reading unit;

when copying is allowed in accordance with the data concerning the propriety of copying, reading a second sheet identifier recorded on the information recording medium attached to the paper sheet on which copying is to be performed, using the second reading unit, and writing the data concerning the propriety of copying on the information recording medium, using the writing unit;

forming an image on the paper sheet on which copying is being performed, based on the image of the original paper sheet; and recording output history data that has the first sheet identifier associated with the second sheet identifier in the output history storing unit, the steps being carried out by the image forming apparatus, wherein when copying is prohibited in accordance with the data concerning the propriety of copying, a copying operation is rejected.

9. A method of managing a printed document, using a printed document managing system that comprises an image forming apparatus that includes a first reading unit that reads information recorded on an information recording medium attached to an original paper sheet and a second reading unit that reads information recorded on an information recording medium attached to a paper sheet on which copying is to be performed, an output history storing unit that records an output history having each document identifier associated with a sheet identifier, and a usage authorization data storing unit that records a user identifier of each user who has authorization of use with respect to each document identifier, the method comprising the steps of:

acquiring the user identifier of a user who wishes a copying operation;

reading a first sheet identifier recorded on the information recording medium attached to the original paper sheet, using the first reading unit;

identifying a document identifier based on the first sheet identifier, using the output history storing unit;

determining whether the user has the authorization of use, based on the acquired user identifier and the identified document identifier;

when the user has the authorization of use, reading a second sheet identifier recorded on the information recording medium attached to the paper sheet on which copying is being performed, using the second reading unit;

forming an image on the paper sheet on which copying is being performed, based on an image of the original paper sheet; and recording output history data that has the first sheet identifier associated with the second sheet identifier in the output history storing unit, the steps being carried out by the printed document managing system.

10. A method of managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, and a printed document managing server that includes an output history storing unit that records an output history having each document identifier associated with a sheet identifier and a usage authorization data storing unit that records a user identifier of each user who has authorization of use with respect to each document identifier, the method comprising the steps of:

acquiring the user identifier of a user who wishes a copying operation, and a first sheet identifier recorded on the information recording medium attached to the original paper sheet, from the image forming apparatus;

identifying a document identifier based on the first sheet identifier, using the output history storing unit;

determining whether the user has the authorization of use, based on the acquired user identifier and the identified document identifier, and then transmitting copying propriety data; and acquiring a second sheet identifier recorded on the information recording medium attached to the paper sheet on which copying is being performed, and then recording output history data that has the first sheet identifier associated with the second sheet identifier in the output history storing unit, the steps being carried out by the printed document managing server.

11. A method of managing a printed document, using an image forming apparatus that includes a reading unit that reads information recorded on an information recording medium attached to a paper sheet on which printing is to be performed, and a writing unit that writes information on the information recording medium attached to the paper sheet on which printing is to be performed, and an output history storing unit that records an output history, the method comprising the steps of:

receiving electronic data of a document for which printing is requested;

reading a sheet identifier recorded on the information recording medium attached to the paper sheet on which printing is being performed;

forming an image on the paper sheet on which printing is being performed, based on the electronic data;

recording information for identifying the printed document on the information recording medium attached to the paper sheet on which printing is being performed; and recording output history data that has the sheet identifier associated with the information for identifying the printed document in the output history storing unit, the steps being carried out by the image forming apparatus, further comprising the step of:

recording data concerning whether copying is allowed on the information recording medium attached to the paper sheet on which printing is being performed, the data being extracted from a copying propriety data storing unit based on a document identifier of the printed document, the step being carried out by the image forming apparatus, using the copying propriety data storing unit which records each document identifier in association with the data concerning whether copying is allowed with respect to each corresponding printed document.

12. The method as claimed in claim 11, further comprising the step of:

determining whether printed information tracing management is necessary, based on data concerning whether the printed information tracing management is necessary, the data being extracted from a tracing management data storing unit based on the document identifier of the document for which printing is requested, the step being carried out by the image forming apparatus, using the tracing management data storing unit that records each document identifier associated with the data concerning whether the tracing management is necessary for each corresponding printed document, the step of recording the information for identifying the printed document and the step of recording the output history data being carried out based on the data concerning whether the tracing management is necessary.

13. A computer-readable medium encoded with a computer program for managing a printed document, using an image forming apparatus that includes a first reading unit that reads information recorded on an information recording medium attached to an original paper sheet, and a second reading unit that reads information recorded on an information recording medium attached to a paper sheet on which copying is to be performed, an output history storing unit that records an output history, and a computer, the program causing the computer to:

when receiving a request to transfer an image of the original paper sheet onto the paper sheet on which copying is to be performed, record output history data including a first sheet identifier, a second sheet identifier, a reception time comprising the time that the image of the original paper sheet is received, and an output time comprising the time of the transfer of the image of the original paper sheet onto the paper sheet on which copying is performed in the output history storing unit, the first sheet identifier being read with the first reading unit, the second sheet identifier being read with the second reading unit.

14. The computer-readable medium encoded with a computer program as claimed in claim 13, wherein the output history data recorded in the output history storing unit further includes a document identifier for identifying the document printed on the original paper sheet.

15. An image forming apparatus connectable to an output history storing unit that records an output history, comprising:

a first reading unit that reads information recorded on an information recording medium attached to an original paper sheet;

a second reading unit that reads information recorded on an information recording medium attached to a paper sheet on which copying is to be performed;

a first operating unit that reads a first sheet identifier recorded on the information recording medium attached to the original paper sheet, using the first reading unit;

a second operating unit that reads a second sheet identifier recorded on the information recording medium attached to the paper sheet on which copying is to be performed, using the second reading unit;

a third operating unit that forms an image on the paper sheet on which copying is being performed, based on an image of the original paper sheet; and a fourth operating unit that records output history data including the first sheet identifier, the second sheet identifier, a reception time comprising the time that the image of the original paper sheet is received, and an output time comprising the time when the image is formed on the paper sheet on which copying is being performed in the output history storing unit.

16. The image forming apparatus as claimed in claim 15, further comprising:

a recording unit that records the first sheet identifier, read by the first operating unit, on the information recording medium attached to the paper sheet on which copying is being performed.

17. The image forming apparatus as claimed in claim 15, further comprising:

a medium attaching unit that attaches the information recording medium to the paper sheet on which the image is to be formed.

18. The image forming apparatus as claimed in claim 15, wherein the information recording medium is a wireless IC chip.

19. An image forming apparatus connectable to a printed document managing server that includes an output history storing unit that records an output history and a copying propriety data storing unit that records data concerning the propriety of copying a printed document, the image forming apparatus comprising:

a first reading unit that reads information recorded on an information recording medium attached to an original paper sheet; a second reading unit that reads information recorded on an information recording medium attached to a paper sheet on which copying is to be performed;

a first identifier reading unit that reads a first sheet identifier recorded on the information recording medium attached to the original paper sheet, using the first reading unit, and then transmits the first sheet identifier to the printed document managing server;

a receiving unit that receives, from the printed document managing server, the data concerning the propriety of copying extracted from the copying propriety data storing unit based on the first sheet identifier;

a second identifier reading unit that reads a second sheet identifier recorded on the information recording medium attached to the paper sheet on which copying is to be performed, using the second reading unit, when copying is allowed in accordance with the data concerning the propriety of copying;

an image forming unit that forms an image on the paper sheet on which copying is being performed, based on an image of the original paper sheet; and an output history recording unit that records output history data that has the first sheet identifier associated with the second sheet identifier in the output history storing unit.

20. An image forming apparatus connectable to an output history storing unit that records an output history, the image forming apparatus comprising:

a first reading unit that reads information recorded on an information recording medium attached to an original paper sheet;

a second reading unit that reads information recorded on an information recording medium attached to a paper sheet on which copying is to be performed;

a writing unit that writes information on the information recording medium attached to the paper sheet on which copying is to be performed;

a first identifier reading unit that reads a first sheet identifier and data concerning the propriety of copying a printed document that are recorded on the information recording medium attached to the original paper sheet, using the first reading unit;

a second identifier reading unit that reads a second sheet identifier recorded on the information recording medium attached to the paper sheet on which copying is to be performed, using the second reading unit, and then writes the data concerning the propriety of copying on the information recording medium, using the writing unit, when copying is allowed in accordance with the data concerning the propriety of copying;

an image forming unit that forms an image on the paper sheet on which copying is being performed, based on an image of the original paper sheet; and an output history recording unit that records output history data that has the first sheet identifier associated with the second sheet identifier in the output history storing unit.

21. An image forming apparatus connectable to an output history storing unit that records an output history, the image forming apparatus comprising:

a reading unit that reads information recorded on an information recording medium attached to a paper sheet on which printing is to be performed;

a writing unit that writes information on the information recording medium attached to the paper sheet on which printing is to be performed;

a data receiving unit that receives electronic data of a document for which printing is requested;

an identifier reading unit that reads a sheet identifier recorded on the information recording medium attached to the paper sheet on which printing is being performed;

an image forming unit that forms an image on the paper sheet on which printing is being performed, based on the electronic data;

a medium recording unit that records information for identifying a printed document on the information recording medium attached to the paper sheet on which printing is being performed; and an output history recording unit that records output history data that has the sheet identifier associated with the information for identifying the printed document in the output history storing unit, wherein, the image forming apparatus is further connected to a copying propriety data storing unit that records each document identifier associated with data concerning whether copying is allowed with respect to each corresponding printed document; and the image forming apparatus further comprises a recording unit that records the data concerning whether copying is allowed on the information recording medium attached to the paper sheet on which printing is being performed, the data being extracted from the copying propriety data storing unit based on the document identifier of the printed document.

22. The image forming apparatus as claimed in claim 21, wherein:

the image forming apparatus can be further connected to a tracing management data storing unit that records each document identifier associated with data concerning whether tracing management is necessary for each corresponding printed document;

the image forming apparatus further comprises a determining unit that determines whether printed information tracing management is necessary, based on the data concerning whether the printed information tracing management is necessary, the data being extracted from the tracing management data storing unit based on the document identifier of the document for which printing is requested; and the recording of the information for identifying the printed document and the recording of the output history data are performed based on the data concerning whether the tracing management is necessary.

23. A printed document managing system comprising:

an image forming apparatus that includes a first reading unit that reads information recorded on an information recording medium attached to an original paper sheet and a second reading unit that reads information recorded on an information recording medium attached to a paper sheet on which copying is to be performed;

an output history storing unit that records an output history having each document identifier associated with a sheet identifier;

an usage authorization data storing unit that records a user identifier of each user who has the authorization of use with respect to each document identifier;

an user identifier acquiring unit that acquires the user identifier of a user who wishes a copying operation;

a first identifier reading unit that reads a first sheet identifier recorded on the information recording medium attached to the original paper sheet, using the first reading unit;

a document identifying unit that identifies a document identifier based on the first sheet identifier, using the output history storing unit;

an authorization determining unit that determines whether the user has the authorization of use, based on the acquired user identifier and the identified document identifier;

a second identifier reading unit that reads a second sheet identifier recorded on the information recording medium attached to the paper sheet on which copying is being performed, using the second reading unit, when the user has the authorization of use;

an image forming unit that forms an image on the paper sheet on which copying is being performed, based on a image of the original paper sheet; and an output history recording unit that records output history data that has the first sheet identifier associated with the second sheet identifier in the output history storing unit.

24. A computer-readable medium encoded with a computer program for managing a printed document, using an image forming apparatus that includes a first reading unit that reads information recorded on an information recording medium attached to an original paper sheet and a second reading unit that reads information recorded on an information recording medium attached to a paper sheet on which copying is to be performed, and a printed document managing server that includes an output history storing unit that records an output history having each document identifier associated with a sheet identifier and an usage authorization data storing unit that records a user identifier of each user who has the authorization of use with respect to each document identifier, the program causing the printed document managing server to:

acquire the user identifier of a user who wishes a copying operation, and a first sheet identifier recorded on the information recording medium attached to the original paper sheet, from the image forming apparatus;

identify a document identifier based on the first sheet identifier, using the output history storing unit;

determine whether the user has the authorization of use, based on the acquired user identifier and the identified document identifier, and then transmit copying propriety data;

acquire a second sheet identifier recorded on the information recording medium attached to the paper sheet on which copying is being performed, and then record output history data that has the first sheet identifier associated with the second sheet identifier in the output history storing unit.

* * * * *